(12) United States Patent
Lee

(10) Patent No.: US 6,803,433 B2
(45) Date of Patent: Oct. 12, 2004

(54) CATALYST FOR OLEFIN POLYMERIZATION AND METHOD FOR PREPARING POLYOLEFINS

(75) Inventor: Bun-Yeoul Lee, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 10/398,678

(22) PCT Filed: Aug. 30, 2002

(86) PCT No.: PCT/KR02/01641

§ 371 (c)(1),
(2), (4) Date: Apr. 9, 2003

(87) PCT Pub. No.: WO03/018643

PCT Pub. Date: Mar. 6, 2003

(65) Prior Publication Data

US 2004/0043894 A1 Mar. 4, 2004

(30) Foreign Application Priority Data

Aug. 31, 2001 (KR) ........................ 2001-53431

(51) Int. Cl.$^7$ ................................. C08F 4/44
(52) U.S. Cl. ................. 526/161; 526/171; 526/172; 502/155; 502/167
(58) Field of Search ................ 526/161, 171, 526/172; 502/155, 167

(56) References Cited

U.S. PATENT DOCUMENTS

| | | | |
|---|---|---|---|
| 5,643,847 A | 7/1997 | Walzer, Jr. ................... | 502/117 |
| 5,939,503 A | 8/1999 | Goddard, III et al. ...... | 526/134 |
| 6,218,493 B1 | 4/2001 | Johnson et al. ............. | 526/351 |

FOREIGN PATENT DOCUMENTS

| | | |
|---|---|---|
| EP | 0 426 637 A2 | 8/1991 |
| EP | 0 558 158 A1 | 1/1993 |
| WO | WO 99/40129 | 8/1999 |

OTHER PUBLICATIONS

"The Search for New–Generation Olefin Polymerization Catalyst: Life beyond Metallocenes"; Authors: George J.P. Britovsek, Vernon C. Gibson and Duncan F. Wass, REVIEWS; Angew. Chem. Int. Ed., vol. 38; 1999, pp. 428–447.

"Intramolecular Ion–Ion Interactions in Zwitterionic Metallocene Olefin Polymerization Catalyst Derived from "Tucked–In" Catalyst Precursors and the Highly Electrophilic Boranes $XB(C6F5)^2$ X = H; C6F5)"; Authors: Yimin Sun, Rupert E. v. H. Spence, Warren E. Piers, Masood Parvez and Glenn P.A. Yap; Journal American Chemical Society, vol. 119, No. 22; 1997; pp. 5132–5143.

"α –Iminocarboxamidato–Nickel (II) Ethylene Polymerization Catalyst"; Authors: Bun Yeoul Lee, Guillermo C. Bazan, Javier Vela, Zachary J. A. Komon and Xianhui Bu; Journal American Chemical Society, vol. 123, No. 22; 2001; pp. 5352–5353.

"Some Modern Methods of Organic Synthesis"; Author: W. Carruthers; Cambridge University Press; pp. 25–37.

Primary Examiner—Robert D. Harlan
(74) Attorney, Agent, or Firm—Cantor Colburn LLP

(57) ABSTRACT

The present invention relates to a catalyst for preparing polyolefin and olefin polymerization using the same, particularly to a method for preparing polyolefin using a compound obtained by activating metalloenamine compound with Lewis acid as a catalyst. Metalloenamine compound having C=C—N—M basic structure is reacted with various Lewis acid (A) to provide zwitterions compound having structure of —A—C—C=N—M+ because a-carbon therein has high nucleophilicity. At this time, a metal has cationic property and thus the compound shows activity for olefin polymerization. The obtained catalyst can be used for various olefin polymerizations.

12 Claims, No Drawings

CATALYST FOR OLEFIN POLYMERIZATION AND METHOD FOR PREPARING POLYOLEFINS

BACKGROUND OF THE INVENTION (a) Field of the Invention

The present invention relates to a catalyst system used for preparing polyolefin and a method for polymerizing olefin using the same.

(b) Description of the Related Art

A metallocene catalyst having cyclopentadienyl ligand as a basic structure is widely used for olefin polymerization. Such a metallocene catalyst requires anionic co-catalyst as a catalyst activator. And, the development of homogeneous catalyst having active, single-site exceeding the range of the conventional metallocene catalyst is actively progressed (G. J. P. Britovsek, V. C. Gibson, D. F. Wass, Angew. Chem., Int. Ed. Eng. 38 (1999) 429). Most active, single-site catalysts as well as metallocene catalysts consist of ion pair of cation and anion. The part where polymerization practically occurs is cationic central metal and it has electrophilic character due to cationic property to increase metal-ethylene bond interaction. In order to show high polymerization activity, anion should not be coordinated with cationic central metal. As an anionic active cocatalyst, compounds having large volume such as methylaluminoxane (MAO) or tris(pentafluorophenyl)boron are used, and when anions derived from these compounds are used, they are not coordinated with central metal and thus high activity can be obtained.

However, in a catalyst in which cation and anion exist as an ion pair, anion turns round central metal to block approach of monomers to center metal, and thus it may inhibit polymerization.

Recently, in order to overcome this, attempts to prepare zwitterion catalyst having anion and cation in one molecule have been reported. The following Equations 1 and 2 show the representative examples.

In Equation 1 a compound in which one part of substituent of cyclopentadienyl is bound to zirconium through methylene group is reacted with tris(pentafluorophenyl)boron to obtain activated zwitterion catalyst (W. E. Piers, et al. J. Am Chem. Soc. 1997, 5132). The structure of the catalyst is similar to that of metallocene catalyst having cyclopentadienyl as a basic structure, except that anion exists in one molecule by covalent bond.

[Equation 1]

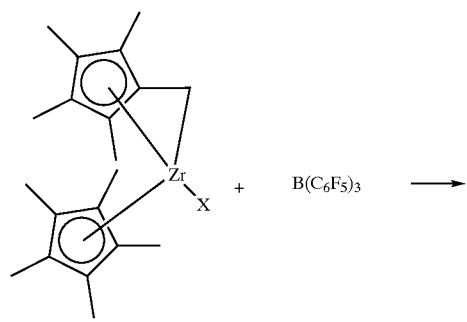

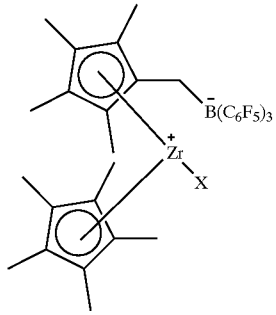

In Equation 2, when carboxamidato-Nickel(II) that has a neutral ligand is reacted with $B(C_6F_5)_3$, Lewis acid $B(C_6F_5)_3$ is attached to an oxygen atom of carbonyl of the ligand to provide activated catalyst in the form of zwitterion compound (Lee, B. Y. et. al. J. Am. Chem. Soc. 2001, 123, 5352).

[Equation 2]

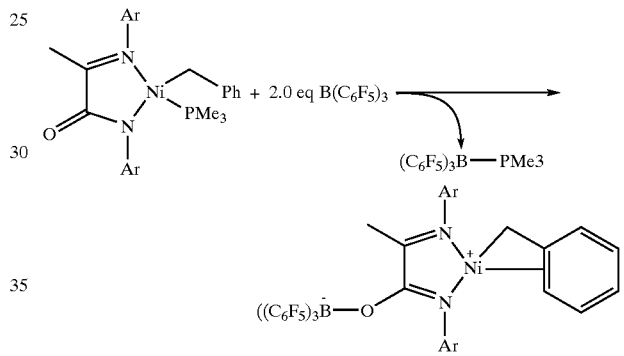

However, conventional catalyst consisting of ion pair mainly uses MAO or tris(pentafluorophenyl)boron in activation step, which are expensive and thus increase cost.

SUMMARY OF THE INVENTION

Accordingly, it is an object of the present invention to provide zwitterion catalysts with various structures through novel reactions, and to provide a method for polymerizing olefin using the same.

Specifically, it is an object of the present invention to provide a catalyst having novel molecular structure and polymer having novel molecular structure.

DETAILED DESCRIPTION AND THE PREFERRED EMBODIMENTS

In order to achieve these objects, the present invention provides a catalyst system comprising metalloenamine compound and Lewis acid. And, the present invention provides a novel chemical reaction for activating metalloenamine compound that is a metal compound. Specifically, as shown in the following Equations 3 and 4, metalloenamine compound is reacted with Lewis acid to provide an activated catalyst having zwitterionic properties.

[Equation 3]

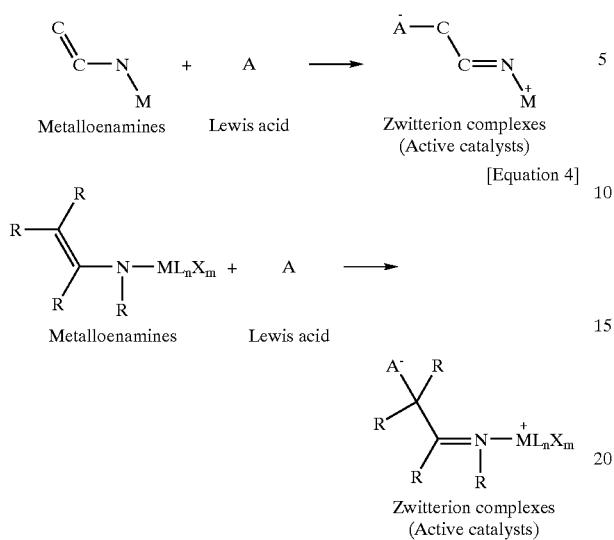

[Equation 4]

Metalloenamine compound generally names all the molecules having C=C—N—M as a basic structure. M is metal atom, N is a nitrogen atom and C is a carbon atom.

As Lewis acid, $R_5-[Al(R_5)-O]_a-AlR^5{}_2$, $AlX_n(R^5)_{3-n}$ or $BX_n(R^5)_{3-n}$, etc. is used. X is an hydrogen, halogen, alkoxy or aryloxy; $R^5$ is halogen radical, hydrocarbyl or halogen-substituted hydrocarbyl; a is an integer of 1 or more; and n is an integer of 0 to 3. When n in $X_n$ is 2 or more, X may be the same or different, and when a is 2 or more, or n in $(R^5)_{3-n}$ is o or 1, R5 may be the same or different.

In addition, the present invention can use the catalyst system for olefin polymerization. Polymerization can be conducted by contacting the catalyst system with olefin monomers at a temperature and pressure sufficient for producing polyolefin.

In an organo-chemical reaction, a metalloenamine compound in which a metal is lithium or magnesium has been studied a lot. Specifically, α-carbon is abundant in electrons and can be used as nucleophile, and thus it is reacted with various electrophiles and useful when making novel carbon-carbon bond (Equation 5, W. Carruthers, Some modern methods of organic synthesis 3 Vol, pp 26 38).

[Equation 5]

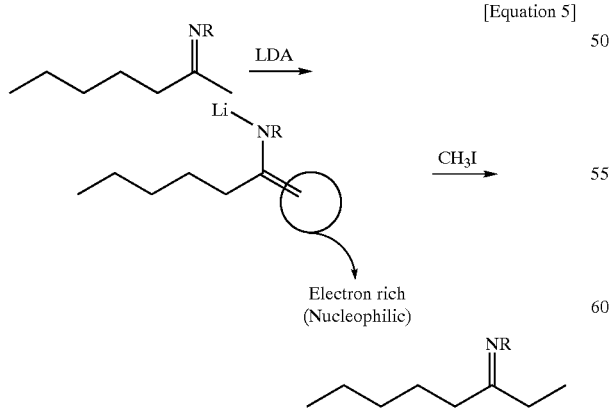

Metalloenamine compound means all the compounds having M—N—C=C basic structure, and the examples are as follows (Structural Formulae 1 and 2). However, the structure of the metalloenamine compound is not limited to these examples.

[Structural Formula 1]

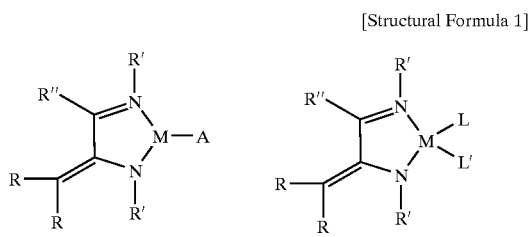

In the above Structural Formula 1, M is Ni, Pd or Pt; R, R' and R" are independently a hydrogen, hydrocarbyl, or substituted hydrocarbyl; A is π-allkyl, substituted π-allyl, π-benzyl or substituted π-benzyl; L is a neutral monodentate ligand that can be substituted with olefin; L' is an anionic monodentate ligand; and L and L' may be connected with each other to form an anionic bidentate ligand.

A concrete example of the metalloenamine compound with the structure of the Structural Formula 1 is as follows:

[Structural Formula 2]

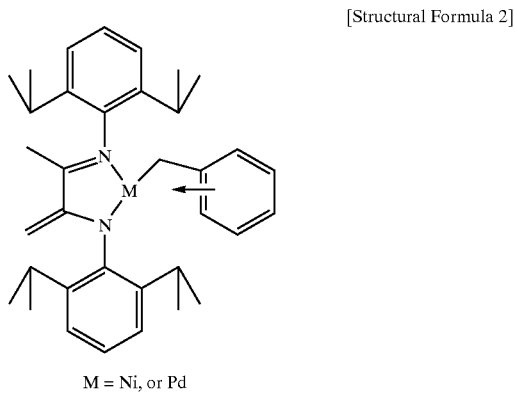

M = Ni, or Pd

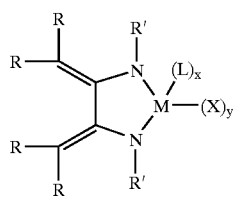

In the Structural Formula 2, M is Ti, Zr, Hf, V or Sc; L is anionic or neutral ligand; and x is 0, 1 or 2. When x is 2, each of L may be the same of different. R, R' are independently a hydrogen radical, hydrocarbyl or substituted hydrocarbyl; X is a halogen radical, alkoxy radical, aryl oxy radical, hydrocaryl or substituted hydrocarbyl; and y is 1 or 2. When y is 2, each of X may be the same or different.

Concrete examples of the metalloenamine compounds with the structure of the Structural Formula 2 are as follows:

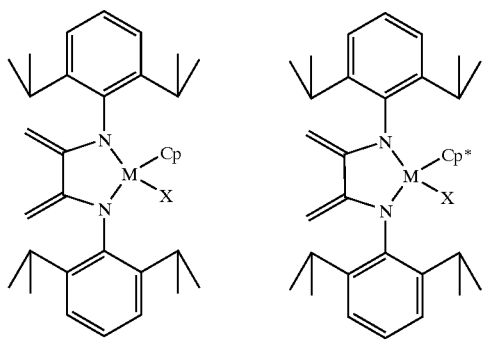

(M = Ti, Zr
X = Chloride, Methyl, Benzyl)

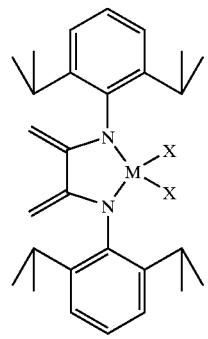

(M = Ti, Zr
X = Chloride, Methyl, Benzyl)

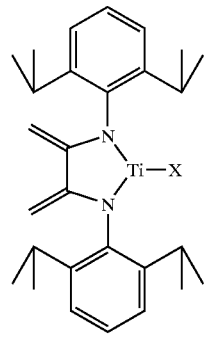

(X = Chloride, Methyl, Bentzyl)

Such metalloenamine compound can be prepared by reacting ketiminate anion ligand with halometal compound. Ketiminate anion ligand can be prepared by deprotonation of imine compound having hydrogen at α-carbon with a suitable base (Equation 6).

[Equation 6]

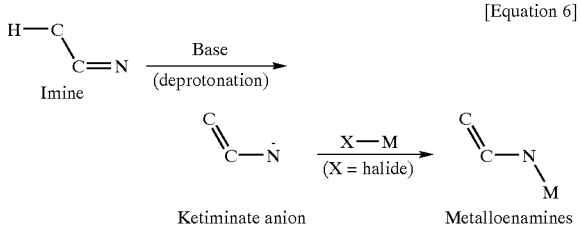

The prepared metalloenamine compound can be activated with Lewis acid to prepare a catalyst for olefin polymerization.

As Lewis acid, the following compounds can be used alone or in combination. However, Lewis acids that can be used are not limited to them.

(1) Aluminoxane Compound Represented by the Following Structural Formula 3

[Structural Formula 3]

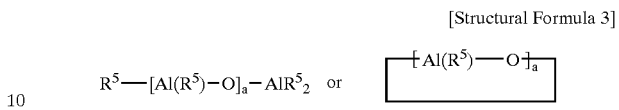

Wherein, $R^5$, which may be the same or different, is halogen radical, hydrocarbyl radical or halogen-substituted hydrocarbyl radical; and a is an integer of 1 or more. When a is 2 or more, $R^5$ may be the same or different. This compound can be linear, circular or network structure. Examples of the compound include methylaluminoxane, ethylalumioxane, isobutylaluminoxane, butylaluminoxane, etc.

(2) Organoalkyl Aluminum Represented by $AlX_n(R^5)_{3-n}$

Wherein, X is a hydrogen, halogen, alkoxy or aryloxy; $R^5$ is as defined in the Structural Formula 3; and n is an integer of 0 to 3. When n in $X_n$ is 2 or more, X may be the same or different, and when n in $(R^5)_{3-n}$ is 0 or 1, $R^5$ may be the same or different. Examples of the compound include tris(pentafluorophenyl)aluminum, trimethylaluminum, triethylaluminum, triisobutylaluminum, tripropylalumium, tributylaluminum, dimethylchloroaluminum, dimethylisobutylaluminum, dimethylethylaluminum, diethylchloroaluminum, triisopropylaluminum, tri-s-butylaluminum, tricyclopentylaluminum, tripentylaluminum, triisopentylaluminum, trihexylaluminum, ethyldimethylaluminum, methyldiethylaluminum, triphenylaluminum, tri-p-tollylaluminum, dimethylaluminum methoxide, dimethylaluminum ethoxide, etc.

(3) Boron Compound Represented by $BX_n(R^5)_{3-n}$

Wherein, X, $R^5$ and n are as defined in (2); and when n in $X_n$ is 2 or more, X may be the same or different; and n in $(R^5)_{3-n}$ is 0 or 1, $R^5$ may be the same or different. Examples of the compound include tris(pentacluorophenyl)boron, bis(pentafluoroboron), trifluoroboron, trichloroboron, triiodeboron, etc.

(4) Anhydrous Transition Metal such as $ZnCl_2$, $FeCl_3$, $TiCl_4$, $TiCl_3$ (5) Lewis acid as described in (1)–(4) that is supported in appropriate carrier such as silica.

(6) Silica Dehydrated at 600° C. or more

On the surface of the treated silica, siloxane group with large ring strain is formed, which can be directly used as Lewis acid.

When the metalloeneamine compound is reacted with Lewis acid, as shown in the Equation 4, Lewis acid attacks α-carbon abundant in electrons and thus activated zwitterion catalyst is obtained.

The catalyst obtained by activating the metalloenamine compound with the Lewis acid can be used for polyolefin preparation. As a solvent used for olefin polymerization, $C_{5-12}$ aliphatic hydrocarbon solvent such as pentane, hexane, heptane, nonane, decane and isomers thereof; aromatic hydrocarbon solvent such as toluene, benzene; or, chlorosubstituted hydrocarbon solvent such as dichloromethane, chlorobenzene can be used alone or in combination. Alternatively, polymerization can be conducted in gas phase without solvent.

Olefin monomers that can be polymerized using the metalloenamine compound and Lewis acid activator include ethylene, α-olefin, cyclic olefin, etc., and diene olefin monomer or triene olefin monomer, etc. having 2 or more double bonds can be polymerized. Examples of the monomers include ethylene, propylene, 1-butene, 1-pentene, 4-methyl-1-pentene, 1-hexene, 1-heptene, 1-decene, 1-undecene, 1-dodecene, 1-tetradecene, 1-hexadecene, 1-eicosene, norbornene, norbornadiene, ethylidenenorbornene, vinylnorbornene, dicylcopentadiene, 1,4-butadiene, 1,5-pentadiene, 1,6-hexadiene, styrene, α-methylstyrene, divinylbenzene, 3-chloromethylstyrene, etc., and 2 or more kinds of these monomers can be copolymerized.

Olefin polymerization according to the present invention can be conducted by common method. Specifically, appropriate amount of catalyst, cocatalyst and organic solvent are introduced in a glass reactor in a dry box, and the reactor is assembled and then taken out of the dry box. Monomers that are liquid at room temperature under atmospheric pressure are introduced together with a solvent, and monomers in gas phase are pressurized in the reactor and agitated. Polymerization is conducted at 25 to 500° C. under 15 to 1500 psi, by adding Lewis acid in mole number of 1 to 30000 times of those of metallocene. In the present invention, contact and introduction sequences of catalyst, cocatalyst, solvent and monomers are not specifically limited.

The present invention will be explained in more detail with reference to the following Examples. However, these are to illustrate the present invention and the present invention is not limited to them.

EXAMPLE

Example 1
Synthesis of Nickel Metalloenamine Compound

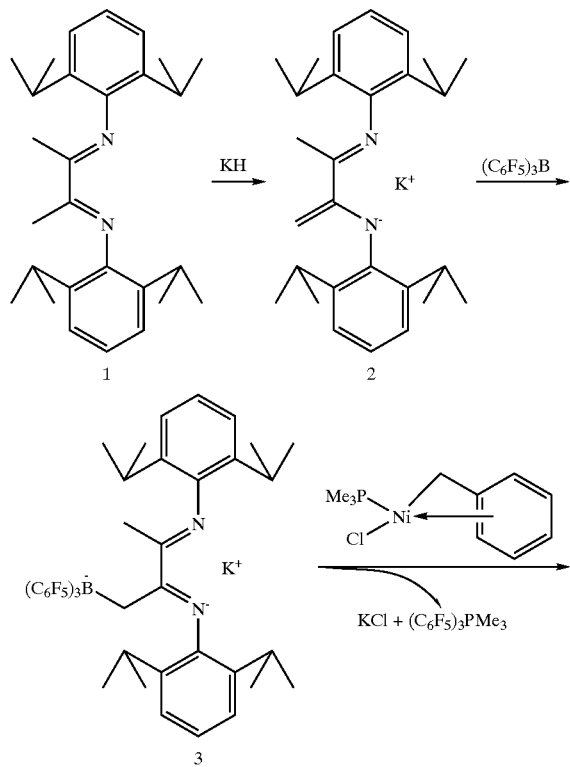

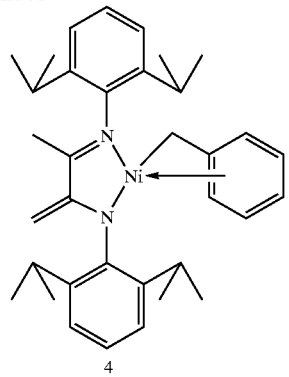

(1) Synthesis of Compound 3

To a one-opening flask, compound 1 (1.62 g, 4.00 mmol), KH (0.16 g, 4.0 mmol) and THF (20 g) were quantified and introduced in a dry box, and then agitated at room temperature for 2 days. As reaction proceeds, hydrogen gas was produced and finally all KH disappeared from the slurry and dark orange solution was obtained. After taking small amount thereof and removing solvent, $^1$H NMR analysis was conducted to confirm that compound 2 was obtained almost quantitatively. NMR spectrum was obtained using 200 MHz equipment manufactured from Varian Company or 300 MHz equipment manufactured from Brooker Company.

$^1$H NMR (300 MHz, $C_6D_6$/THF-$d_8$ (10:1)): 7.35 (d, J=7.6 Hz, 2 H, ph-H$^{3,5}$), 7.12 (d, J=7.6 Hz, 2 H, ph-H$^{3,5}$), 7.12 (t, J=7.6 Hz, 1 H, ph-H$^4$), 7.03 (t, J=7.6 Hz, 1 H, ph-H$^4$), 4.22 (d, J=1.0 Hz, 1 H, =$CH_2$), 3.85 (septet, J=6.8 Hz, 2 H, iPr—CH), 3.59 (d, J=1.0 Hz, 1 H, =$CH_2$), 3.05 (septet, J=6.8 Hz, 2 H, iPr—CH), 2.13 (s, 3 H, $CH_3$), 1.59 (d, J=6.8 Hz, 6 H, iPr—$CH_3$), 1.33 (d, J=6.8 Hz, 6 H, iPr—$CH_3$), 1.18 (d, J=6.8 Hz, 6 H, iPr—$CH_3$), 1.15 (d, J=6.8 Hz, 6 H, iPr—$CH_3$)

Solvent was completely removed using a vacuum pump, and then $B(C_6F_5)_3$ (2.05 g, 4.0 mmol) and 20 mL of toluene were introduced and agitated for about 30 minutes. The solution was filtered to remove a little suspension, and then 40 mL of pentane was introduced in a filtered solution. When standing at room temperature overnight, pale yellow crystals were precipitated and the precipitate was filtered to obtain compound 3. As result of NMR analysis, it was found that one toluene molecule is inserted. Yield was 3.30 g (79%).

$^1$H NMR (300 MHz, $C_6D_6$/THF-$d_8$ (10:1)): 7.2 7.0 (m, 8 H, toluene, ph-H$^{3,4,5}$), 6.91 (br d, J=7.6 Hz, 2 H, ph-H$^{3,5}$), 6.81 (br d, J=7.6 Hz, 2 H, ph-H$^4$), 3.47 (br s, 2 H, $CH_2$—B), 2.89 (br septet, J=6 Hz, 2 H, iPr—CH), 2.37 (septet, J=6.8 Hz, 2 H, iPr—CH), 2.12 (s, toluene), 1.78 (br s, 3 H, $CH_3$), 1.23(d, J=6.8 Hz, 6 H, iPr—$CH_3$), 1.10 (d, J=6.8 Hz, 6 H, iPr—$CH_3$), 1.09 (br d, J=6 Hz, 6 H, iPr—$CH_3$), 1.00 (br d, J=6 Hz, 6 H, iPr—$CH_3$). $^{13}$C NMR ($C_6D_6$/THF-$d_8$(10:1)): 176.13, 170.85 (C=N), 150 (dm, J=960 Hz, p-CF), 148.32, 145.78 (ipso-C), 139.3 (dm, J=480 Hz, o-CF), 138.24 (toluene), 137.67, 137.09 (ph-$C^2$), 136.9 (dm, J=560 Hz, m-CF), 129.67 (toluene), 128.89 (toluene), 126.02 (toluene), 124.43, 123.81 (ph-$C^4$), 123.81, 123.39 (ph-$C^3$), 32.72 (m, B—$CH_2$), 28.31, 28.00 (iPr—CH), 25.06, 24.87, 24.16, 23.08 (iPr—$CH_3$), 21.74 (toluene), 19.52 ($CH_3$)

(2) Synthesis of Compound 4

To one-opening flask in a dry box, compound 3 (0.523 g, 0.500 mmol), Ni($\eta^3$-$CH_2C_6H_5$)Cl(PMe$_3$) (0.131 g) and toluene (4 g) were introduced and agitated at room temperature overnight. The mixture was filtered to remove KCl produced as by-product, and then solvent was completely removed by vacuum decompression. Approximately 10 mL of pentane was introduced and the mixture was filtered on a celite to obtain dark red solution. Solvent was completely removed to obtain red solid. As result of $^1$H NMR structural analysis, it can be confirmed that almost pure compound was obtained and that two rotomers exist in a ratio of about 4:1 according to location of $\eta_3$-benzyl ligand in benzene. However, it can be seen that $\eta^3$-benzyl turned into $\eta^1$-benzyl, therefore changing into one compound, by changing solvent to acetonitrile. Yield was 0.255 g (81%). In the following NMR data, peaks written in bold letters are those interpreted to derive from minor isomer.

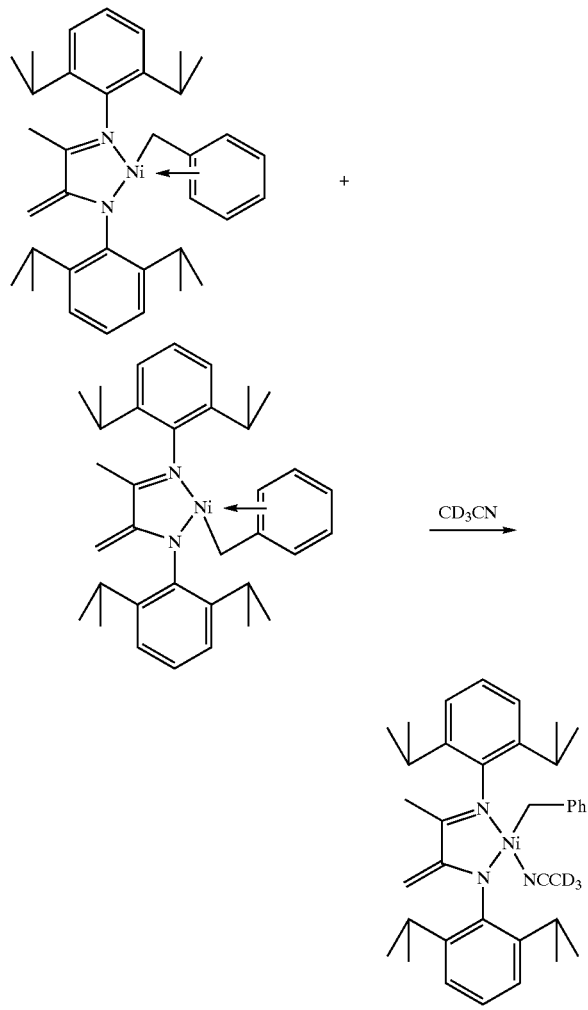

$^1$H NMR (300 MHz, C$_6$D$_6$): δ7.4 6.9 (m, 6 H, ph-H$^{3,4,5}$), 6.58 and 6.76 (t, J=7.6 Hz, benyl-p-H), 6.27 and 6.42 (t, J=7.6 Hz, benyl-m-H), 6.06 and 5.96 (d, J=7.6 Hz, benyl-o-H), 4.15 and 3.72 (septet, J=6.8 Hz, 2 H, iPr—CH), 4.13 and 4.19 (s, 1 H, C=CH$_2$), 3.83 and 3.76 (s, 1 H, C=CH$_2$), 3.10 and 3.52 (septet, J=6.8 Hz, 2 H, iPr—CH), 1.54 and 1.36 (d, J=6.8 Hz, 6 H, iPr—CH$_3$), 1.52 and 1.57 (s, 3 H, CH$_3$), 1.49 and 1.20 (s, 2 H, benzyl-CH$_2$), 1.46 and 1.36 (d, J=6.8 Hz, 6 H, iPr—CH$_3$), 1.12 and 1.02 (d, J=6.8 Hz, 6 H, iPr—CH$_3$), 0.90 and 1.02 (d, J=6.8 Hz, 6 H, iPr—CH$_3$). $^1$H NMR (300 MHz, CD$_3$CN): 7.3 6.8 (m, 11 H, ph-H and benzyl), 4.07 (s, 1 H, C=CH$_2$), 4.05 (br septet, J=7 Hz, 2 H, iPr—CH), 3.52 (br septet, J=7 Hz, 2 H, iPr—CH), 3.13 (s, 1 H, C=CH$_2$), 1.82 (s, 3 H, CH$_3$), 1.43 (br d, J=7 Hz, 6 H, iPr—CH$_3$), 1.40 (br d, J=7 Hz, 6 H, iPr—CH$_3$), 1.34 (s, 2 H, benzyl-CH$_2$), 1.32 (br d, J=7 Hz, 6 H, iPr—CH$_3$). $^{13}$C NMR (75 MHz, CD$_3$CN): 176.47 (C=N), 161.33 (CH$_2$C—N), 154.99, 147.79 (ph-C$^1$), 147.57, 140.08 (ph-C$^2$), 143.88 (benzyl-ipso-C), 128.38, 127.93, 126.82 (benzyl), 124.72, 121.79 (ph-C$^4$), 124.06, 123.94 (ph-C$^3$), 87.22 (CH$_2$—C—N), 29.25, 28.59 (iPr—CH), 25.82, 24.39, 23.78, 23.64 (iPr—CH$_3$), 20.02, 17.83 (CH$_3$, benzyl-CH$_2$)

Example 2

Reaction of Compound 4 with Lewis Acid

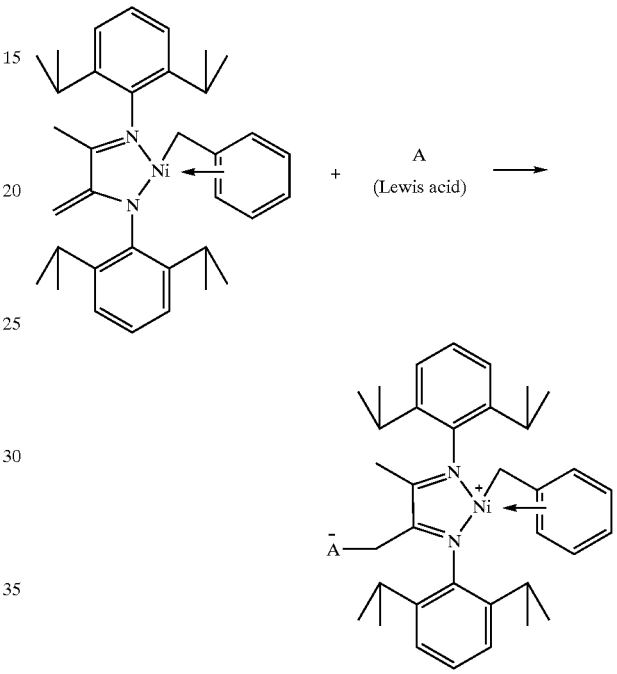

(1) Reaction with B(C$_6$F$_5$)$_3$

Compound 4 (13.8 mg, 0.025 mmol) and B(C$_6$F$_5$)$_3$ (12.8 mg, 0.025 mmol) were dissolved in C$_6$D$_6$ and $^1$H NMR analysis was conducted. It can be confirmed that two rotomers by η$^3$-benzyl exist in a ratio of about 3:1. Hydrogen of CH$_2$=C shown as pair appeared as one, indicating that B(C$_6$F$_5$)$_3$ reacted with carbon in double bond.

$^1$H NMR (300 MHz, C$_6$D$_6$): δ7.16 (t, J=7.6 Hz, 1 H, ph-H$^4$), 7.02 (t, J=7.6 Hz, 1 H, ph-H$^4$), 7.02 and 6.93 (d, J=7.6 Hz, 2 H, ph-H$^3$), 6.83 and 6.91 (d, J=7.6 Hz, 2 H, ph-H$^3$), 6.60 and 6.61 (t, J=7.6 Hz, 1 H, benyl-p-H), 6.01 and 6.03 (t, J=7.6 Hz, 2 H, benyl-m-H), 5.82 and 5.88 (d, J=7.6 Hz,2 H, benyl-o-H), 3.33 and 3.24 (br d, J=7.2 Hz, 1 H, CH$_2$—B), 3.30 and 3.20 (br d, J=7.2 Hz, 1 H, CH$_2$—B), 2.90 and 2.99 (septet, J=6.8 Hz, 2 H, iPr—CH), 2.60 and 2.72 (septet, J=6.8 Hz, 2 H, iPr—CH), 1.46 and 1.40 (s, 2 H, benzyl-CH$_3$), 1.32 and 1.21 (d, J=6.8 Hz, 6 H, iPr—CH$_3$), 1.20 and 1.10 (d, J=6.8 Hz, 6 H, iPr—CH$_3$), 0.95 and 1.08 (s, 3 H, CH$_3$), 0.90 and 0.98 (d, J=6.8 Hz, 6 H, iPr—CH$_3$), 0.85 and 0.92 (d, J=6.8 Hz, 6 H, iPr—CH$_3$).

(2) Reaction with BF$_3$

Compound 4 (13.8 mg, 0.025 mmol) was dissolved in benzene (about 0.3 mL) and a solution in which BF$_3$ (3.6 mg, 0.025 mmol) was dissolved in benzene (about 0.3 mL) was slowly added while agitating. After completely removing volatile material using a vacuum pump, the mixture was dissolved in C$_6$D$_6$ and $^1$H NMR analysis was conducted. It can be confirmed that two rotomers by η³-benzyl exist in a ratio of about 3:2.

¹H NMR (200 MHz, C₆D₆): δ7.2 6.8 (m, 6 H, ph-H³,⁴,⁵), 6.63 and 6.67 (t, J=7.8 Hz, 1 H benyl-p-H), 6.18 and 6.22 (t, J=7.8 Hz, 2 H, benyl-m-H), 5.94 and 5.91 (d, J=7.8 Hz, 2 H, benyl-o-H), 3.28 and 3.66 (septet and br septet, J=6.8 Hz, 2 H, iPr—CH), 2.86 and 2.43 (septet and br septet, J=6.8 Hz, 2 H, iPr—CH), 2.3 2.0 (br, 2 H, CH₂—B), 2.08 and 2.15 (s, 3 H, CH₃), 1.51 and 1.42 (s, 2 H, benzyl-CH₂), 1.42 and 1.28 (d, J=6.8 Hz, 6 H, iPr—CH₃), 1.40 and 1.25 (d, J=6.8 Hz, 6 H, iPr—CH₃), 1.00 and 1.06 (d, J=6.8 Hz, 6 H, iPr—CH₃), 0.94 and 1.06 (d, J=6.8 Hz, 6 H, iPr—CH₃).

(3) Reaction with Al(C₆F₅)₃

Compound 4 (13.8 mg, 0.025 mmol) and Al(C₆F₅)₃ (15.5 mg, 0.025 mmol) were dissolved in C₆D₆ and ¹H NMR analysis was conducted. It can be confirmed that two rotomers by η³-benzyl exist in a ratio of about 3:2. Hydrogen in CH₂=C shown as one pair appeared as one, indicating that Al(C₆F₅)₃ reacted with carbon in double bond.

¹H NMR (200 MHz, C₆D₆): δ7.2 6.8 (m, 6 H, ph-H³,⁴,⁵), 6.61 and 6.59 (t, J=7.8 Hz, 1 H benyl-p-H), 6.10 and 6.09 (t, J=7.8 Hz, 2 H, benyl-m-H), 5.86 and 5.82 (d, J=7.8 Hz, 2 H, benyl-o-H), 3.24 and 3.21 (septet, J=6.8 Hz, 2 H, iPr—CH), 2.78 and 2.95 (septet, J=6.8 Hz, 2 H, iPr—CH), 2.74 (br s, 2 H, CH²—Al), 1.65 and 1.67 (s, 3 H, CH₃), 1.43 and 1.40 (s, 2 H, benzyl-CH₂), 1.24 and 1.27 (d, J=6.8 Hz, 6 H, iPr—CH₃), 1.10 and 1.07 (d, J=6.8 Hz, 6 H, iPr—CH₃), 0.99 and 0.96 (d, J=6.8 Hz, 6 H, iPr—CH₃), 0.90 and 0.87 (d, J=6.8 Hz, 6 H, iPr—CH₃).

Example 3

Synthesis of Zirconium Metalloenamine Compound

Metalloenamine compound comprising early transition metal can be synthesized by the following method

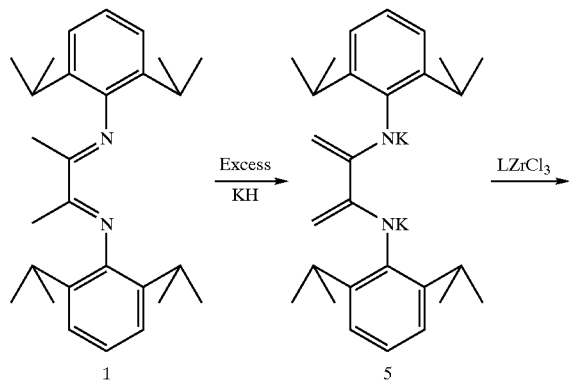

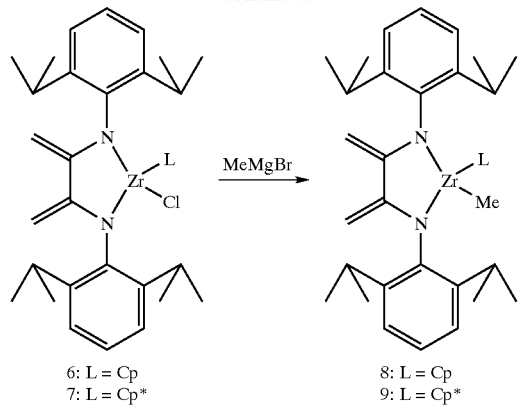

6: L = Cp
7: L = Cp*

8: L = Cp
9: L = Cp*

(1) Synthesis of Compound 5

Compound 1 (7.00 g, 17.3 mmol) and KH (3.47 g, 86.5 mmol) were agitated for 6 days in anhydrous THF (50 ml) under argon atmosphere while removing hydrogen gas produced during reaction. Unreacted KH was filtered using a celite, and the solution was distilled under reduced pressure to concentrate. The concentrated THF solution was stored at −30° C. in a refrigerator and white crystal was deposited. THF was decanted and remaining THF was removed with a vacuum pump. Obtained solid was made into powder using pentane, and then filtered and washed with pentane to obtain yellow powder compound 5 (6.74 g, 75.3%, containing ½THF).

¹H-NMR (200 MHz, C₆D₆/THG-d₈ (10:1)): δ7.22 (d, J=7.6 Hz, 4H, ph-H³), 6.95 (t, J=7.6 Hz, 2H, , ph-H⁴), 3.92 (septet, J=6.7 Hz, 4 H, iPr—CH), 3.09 (d, J=3.7 Hz, 2 H, C=CH₂), 2.49 (d, J=3.5 Hz, 2 H, C=CH₂), 1.48 (d, J=6.7 Hz, 12 H, iPr—CH₃), 1.31 (d, J=6.7 Hz, 12 H, iPr—CH₃). ¹³C NMR (75 MHz, C₆D₆/THF-d₈ (10:1)): δ170.65 (CH₂—C—N), 156.20 (ph-C¹), 142.49 (ph-C³), 122.71 (ph-C⁴) 118.12 (ph-C²), 67.77 (CH2=C), 27.75 (iPr—CH ), 25.78 (iPr—CH₃), 25.11 (iPr—CH₃).

(2) Synthesis of Compound 6

Compound 5 (0.283 g, 0.588 mmol), CpZrCl₃ (0.155 g, 0.588 mmol), and anhydrous THF (7 ml) cooled to −30° C. was added, and the mixture was agitated at room temperature under nitrogen atmosphere for 12 hours. The mixture was filtered using celite to remove produced salts and distilled under reduced pressure. And, the obtained solid was extracted with pentane and distilled under reduced pressure to concentrate, and then recrystallized at −30° C. to obtain red needle crystal compound 6 (0.190 g, 54%).

¹H-NMR (200 MHz, C₆D₆): δ7.3 7.6 (m, 6 H, ph-H³,⁴,⁵), 5.95 (s, 5 H, Cp), 4.69 (s, 2 H, C=CH₂), 3.62 (s, 2 H, C=CH₂), 3.51 (septet, J=6.8 Hz, 2 H, iPr—CH), 3.46 (septet, J=6.8 Hz, 2 H, iPr—CH ), 1.38 (d, J=6.8 Hz, 12 H, iPr—CH₃), 1.29 (d, J=6.8 Hz, 12 H, iPr—CH₃), 1.29 (d, J=6.8 Hz, 12 H, iPr—CH₃), 1.25 (d, J=6.8 Hz, 12 H, iPr—CH₃). ¹³C NMR (75 MHz, C₆D₆) 151.89 (CH₂—C—N), 145.57, 144.28, 142.72 (ph-C¹,³,⁵), 126.99, 124.92, 124.16 (ph-C²,⁴,⁶), 116.28 (Cp), 92.20 (CH₂=C), 28.90, 28.57 (iPr—CH ), 26.25, 25.94, 25.49, 24.73 (iPr—CH₃).

(3) Synthesis of Compound 7

Compound 2 and (0.166 g, 0.345 mmol) and Cp*ZrCl₃ (0.115 g, 0.345 mmol) were agitated at room temperature under nitrogen atmosphere for 12 hours in anhydrous toluene (5 ml). The mixture was filtered using celite to remove produced salts and distilled under reduced pressure. And, the obtained solid was extracted with pentane and distilled under reduced pressure to obtain red solid compound 7 (180 mg, 79%).

$^1$H-NMR (200 MHz, C$_6$D$_6$): δ 7.3 7.1 (m, 6 H, ph-H$^{3,4,5}$), 4.83 (s, 2 H, C=CH$_2$), 3.72 (s, 2 H, C=CH$_2$), 3.39 (septet, J=6.8 Hz, 2 H, iPr—CH), 3.20 (septet, J=6.8 Hz, 2 H, iPr—CH), 1.66 (s, 15 H, Cp*—CH$_3$), 1.39 (d, J=6.8 Hz, 12 H, iPr—CH$_3$), 1.34 (d, J=6.8 Hz, 12 H, iPr—CH$_3$), 1.33 (d, J=6.8 Hz, 12 H, iPr—CH$_3$), 1.31 (d, J=6.8 Hz, 12 H, iPr—CH$_3$).

(4) Synthesis of Compound 8

Compound 6 (150 mg, 0.252 mmol) was dissolved in 5 g of diethylether, and 1.0 equivalent of MeMgBr was added thereto at room temperature. Red solution turned into dark yellow. The mixture was agitated at room temperature for 2 hours and then filtered. After completely removing solvent, remaining oil was extracted with pentane again. Pentane was removed using a vacuum pump to obtain dark yellow sticky solid. As results of NMR analysis, it can be seen that very pure compound was obtained. Yield was 130 mg (90%).

$^1$H NMR (200 MHz, C$_6$D$_6$): 7.3 7.1 (m, 6 H, ph-H$^{3,4,5}$), 5.85 s, 5 H, Cp), 4.73 (s, 2 H, CH$_2$=C), 3.58 (s, 2 H, CH$_2$=C), 3.58 (septet, J=6.8 Hz, 2 H iPr—CH), 3.33 (septet, J=6.8 Hz, 2 H, iPr—CH), 1.38 (d, J=6.8 Hz, 6 H, iPr—CH$_3$), 1.34 (d, J=6.8 Hz, 6 H, iPr—CH$_3$), 1.35 (d, J=6.8 Hz, 6 H, iPr—CH$_3$), 1.19 (d, J=6.8 Hz, 6 H, iPr—CH$_3$), 0.67 (s, Zr—CH$_3$).). $^{13}$C NMR (75 MHz, C$_6$D$_6$) 153.49 (CH$_2$—C—N), 145.14, 143.67, 143.21 (ph-C$^{1,3,5}$), 126.56, 124.77, 123.91 (ph-C$^{2,4,6}$), 114.72 (Cp), 89.64 (CH$_2$=C), 30.54 (Zr—CH$_3$), 28.68, 28.37 (iPr—CH), 26.16, 26.04, 25.60, 24.56 (iPr—CH$_3$).

(4) Synthesis of Compound 9

Compound 9 was prepared under the same conditions as Compound 8. It was recrystallized from pentane solution at 30° C. to purify. It was obtained as red crystal and the yield was 63%.

$^1$H-NMR (200 MHz, C$_6$D$_6$): δ 7.3 7.1 (m, 6 H, ph-H$^{3,4,5}$), 4.88 (s, 2 H, C=CH$_2$), 3.70 (s, 2 H, C=CH$_2$), 3.51 (septet, J=6.8 Hz, 2 H, iPr—CH), 3.03 (septet, J=6.8 Hz, 2 H, iPr—CH), 1.60 (s, 15 H, Cp*—CH$_3$), 1.42 (d, J=6.8 Hz, 12 H, iPr—CH$_3$), 1.39 (d, J=6.8 Hz, 12 H, iPr—CH$_3$), 1.28 (d, J=6.8 Hz, 12 H, iPr—CH$_3$), 1.27 (d, J=6.8 Hz, 12 H, iPr—CH$_3$), 0.63 (s, Zr—CH$_3$).

Example 4

Ethylene Polymerization

Suitable amount of catalyst and Lewis acid cocatalyst were dissolved in 30 mL of toluene and introduced in an approximately 100 mL high-pressure glass reactor in a dry box. And, the reactor was taken out of the dry box and ethylene was added under suitable pressure to prepare a polymer. Obtained polymer solution or slurry was poured into a flask containing 100 mL of acetone, and white polymer obtained therein was filtered and distilled under reduced pressure to remove solvent to obtain polymer.

(1) Compound 4 (0.025 mmol) was activated with B(C$_6$F$_5$)3 (0.025 mmol) and polymerized at room temperature under pressure of 100 psi for 10 minutes to obtain 0.083 g of polymer.

(2) Compound 4 (0.025 mmol) was activated with Al(C$_6$F$_6$)3 (0.025 mmol) and polymerized at room temperature under pressure of 100 psi for 10 minutes to obtain 0.083 g of polymer.

(3) Compound 4 (0.010 mmol) was activated with methylaluminoxane (5.00 mmol) and polymerized at room temperature under pressure of 100 psi for 5 minutes to obtain 0.227 g of polymer.

(4) Compound 6 (0.00050 mmol) was activated with methylaluminoxane (2.50 mmol) and polymerized at 60° C. under pressure of 60 psi for 15 minutes to obtain 1.389 g of polymer.

As explained, the metalloenamine compound disclosed in the present invention has been very rarely synthesized and there has not been any attempt to activate such metalloenamine compound with Lewis acid to use for polyolefin polymerization. Therefore, according to the present invention, structure of metalloenamine compound and activator Lewis acid can be variously changed to prepare catalyst with desired properties.

In addition, the catalyst prepared by this method has the following advantages compared to the conventional catalyst consisting of ion pair. First, anion and cation exist in one molecule, and anion is prevented from being coordinated with cation central metal according to the structure of molecule. Thus, it is not required that methylaluminoxane (MAO) or tris(pentafluorophenyl)boron with large volume and high cost should be used as Lewis acid, and it is possible to use inexpensive BX$_3$ (X is halogen) or generally used alkylaluminum compound (AlR$_n$X$_m$, n+m=3, R is hydrocarbyl or aryl, X is halogen or alkoxy or aryloxy). Second, in a catalyst consisting of ion pair, anion turns round central metal and thus it may block the approach of monomers to central metal when polymerizing. However, in zwitterion catalyst of the present invention, anion is located behind central metal and thus there is no need to be concerned about this problem. Third, supported catalyst can be easily prepared using Lewis acid supported in a suitable carrier and thus the present invention can be easily applied for gas phase process or slurry process requiring a supported catalyst.

What is claimed is:

1. A catalyst system comprising metalloenamine compound and Lewis acid.

2. The catalyst system according to claim 1, wherein the metalloenamine compound is represented by the following Structural Formula 1-1 or Structural Formula 1-2:

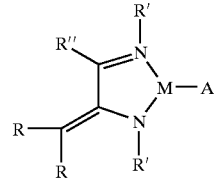

[Structural Formula 1-1]

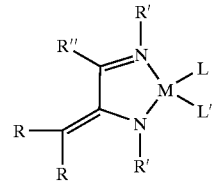

[Structural Formula 1-2]

wherein, M is Ni, Pd or Pt; R, R' and R" are independently a hydrogen radical, hydrocarbyl or substituted hydrocarbyl; A is n-allyl, substituted n-allyl, n-benzyl or substituted n-benzyl; L is a neutral monodentate ligand that can be substituted with olefin; L' is an anionic monodentate ligand.

3. The catalyst system according to claim 1, wherein the metalloenamine compound is represented by the following Structural Formula 2:

[Structural Formula 2]

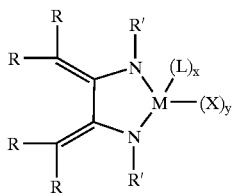

wherein, M is Ti, Zr, Hf, V or Sc; L is an anionic or neutral ligand; x is 0, 1 or 2, R and R' are independently a hydrogen radical, hydrocarbyl or substituted hydrocarbyl; X is halogen radical, alkoxy radical, aryloxy radical, hydrocarbyl or substituted hydrocarbyl; and y is 1 or 2.

4. The catalyst system according to claim 3, wherein in the Structural Formula 2, L is cyclopentadienyl, substituted cyclopentadienyl, indenyl, substituted indenyl, fluorenyl or substituted fluorenyl; and X is halogen or alkyl.

5. The catalyst system according to claim 1, wherein the Lewis acid is selected from a group consisting of the compound of the following Structural Formula 3; $AlX_n$-$(R^5)_{3-n}BX_n(R^5)_{3-n}$ anhydrous transition metal $ZnCl_2$, $FeCl_3$, $TiCl_4$, $TiCl_3$; silica dehydrated at 600° C. or more; and a mixture thereof:

[Structural Formula 3]

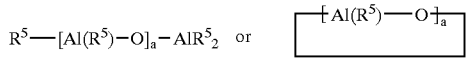

Wherein, $R^5$ is halogen radical, hydrocarbyl or halogen-substituted hydrocarbyl; and a is an integer of 1 or more; X is a hydrogen, halogen, alkoxy or aryloxy; and n is an integer of 0 to 3.

6. A method for preparing polyolefin, comprising using a catalyst system for olefin polymerization at a temperature of 25 to 500° C. under pressure of 15 to 1500 psi, the catalyst system comprising metalloenamine compound and Lewis acid.

7. The method for preparing polyolefin according to claim 6, wherein the olefin is selected from a group consisting of $R^1CH\!\!=\!\!CH_2$, cyclopentene, norbornene, $H_2C\!\!=\!\!CH(CH_2)sCO_2R^2$, and a mixture thereof wherein, $R^1$, and $R^2$ is independently a hydrogen, hydrocarbyl or substituted hydrocarbyl; and s is an integer of 1 to 10.

8. The catalyst system according to claim 2, wherein L and L' are connected with each other to form an anionic bidentate ligand.

9. The catalyst system according to claim 3, wherein, when x is 2, each of L is the same or different.

10. The catalyst system according to claim 3, wherein, when y is 2, each of X is the same or different.

11. The catalyst system according to claim 5, wherein, when a is 2 or more, $R^5$ is the same or different.

12. The catalyst system according to claim 5, wherein, when n is 2 or more, X is the same or different.

* * * * *